(12) United States Patent
Hozumi et al.

(10) Patent No.: US 8,467,940 B2
(45) Date of Patent: Jun. 18, 2013

(54) APPARATUS FOR POWER SEAT

(75) Inventors: Soichiro Hozumi, Nishio (JP); Misato Maeda, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 358 days.

(21) Appl. No.: 12/854,396

(22) Filed: Aug. 11, 2010

(65) Prior Publication Data

US 2011/0046855 A1 Feb. 24, 2011

(30) Foreign Application Priority Data

Aug. 21, 2009 (JP) ................................ 2009-192296

(51) Int. Cl.
*B60R 22/00* (2006.01)
(52) U.S. Cl.
USPC ............................................................ 701/49
(58) Field of Classification Search
USPC ............................................................ 701/49
See application file for complete search history.

(56) References Cited

U.S. PATENT DOCUMENTS

| 6,198,244 | B1 | 3/2001 | Hayden et al. |
| 2002/0185985 | A1 | 12/2002 | Fraser |
| 2004/0140783 | A1 | 7/2004 | Fukuhara et al. |
| 2009/0295322 | A1 | 12/2009 | Noda et al. |

FOREIGN PATENT DOCUMENTS

| DE | 42 17 664 A1 | 12/1992 |
| JP | 2001-277909 A | 10/2001 |

OTHER PUBLICATIONS

Translation of JP 2001-277909A.*
European Search Report dated Dec. 23, 2010, issued by the European Patent Office in corresponding European patent application No. 10173267.

* cited by examiner

*Primary Examiner* — Michael McCullough
(74) *Attorney, Agent, or Firm* — Buchanan Ingersoll & Rooney PC

(57) ABSTRACT

An apparatus for a power seat includes: a motor; a transmitting member mechanically connected to a seat and driven by the motor, thereby changing a state of the seat; an operational switch outputting an operational signal indicating a changing direction of the state of the seat; a sensor outputting a single pulse according to a rotation of the motor; a controlling portion driving the motor in a rotational direction corresponding to the operational signal and counting the pulse outputted according to the rotation of the motor, thereby determining and memorizing the state of the seat; a judging portion judging the changing direction of the state of the seat after a start of the driving of the motor on the basis of the pulse; and a drive continuing portion continuing the driving of the motor until the changing direction of the state of the seat is judged.

8 Claims, 3 Drawing Sheets

FIG. 3

APPARATUS FOR POWER SEAT

CROSS REFERENCE TO RELATED APPLICATIONS

This application is based on and claims priority under 35 U.S.C. §119 to Japanese Patent Application 2009-192296, filed on Aug. 21, 2009, the entire content of which is incorporated herein by reference.

TECHNICAL FIELD

This disclosure relates to an apparatus for a power seat changing a state of a seat by a driving force of a motor, determining the state of the seat using a sensor for detecting a rotation of the motor, and memorizing the determined state of the seat.

BACKGROUND DISCUSSION

A known apparatus for a power seat is disclosed in JP2001-277909A. According to the apparatus for the power seat of JP2001-277909A, a pair of upper rails for supporting a seat is arranged at a pair of lower rails fixed at a vehicle floor so as to be relatively slidable. The pair of upper rails is moved relative to the pair of lower rails by means of a driving force of a slide motor in a front-rear direction of a vehicle, thereby changing a position of the seat in the front-rear direction of the vehicle.

Further, the apparatus for the power seat includes a sensor that outputs a single pulse in accordance with a rotation of a motor (i.e., a sensor having only one hall element). A position of the seat in the front-rear direction of the vehicle is determined on the basis of a counted pulse, and then, the position of the seat is memorized. A rotational direction of the motor is judged on the basis of an output direction (an electrical characteristic) of the motor. In a case where the rotation of the motor is stopped when the seat reaches an end of a movable range, the motor becomes a mechanically-locked state (a motor-locked state), and the driving (an output) of the motor is stopped. At that time, the motor may be driven in a reverse direction (a reverse rotation) due to a reaction force of a load-applied side. Consequently, a difference may be generated between an actual position of the seat in the front-rear direction of the vehicle and a position of the seat determined and memorized by the apparatus. Accordingly, in order to restrict the generation of the difference, according to the apparatus for the power seat of JP2001-277909A, whether the motor is in the mechanically-locked state or not is determined, and a pulse that is outputted after the mechanically-locked state of the motor is determined is determined to correspond to the reverse rotation of the motor, thereby correctly determining the position of the seat in the front-rear direction of the vehicle.

However, according to the apparatus for the power seat of JP2001-277909A, in a case where the driving of the motor, which has been in the mechanically-locked state, is started in response to an operation of an operational switch, and subsequently the driving motor is stopped before the mechanically-locked state of the motor is determined, the pulse outputted from the sensor after the stopping of the driving of the motor is determined to correspond to a forward direction of the motor (i.e., a direction corresponding to a last output direction of the motor, or a rotation indicated by the operational switch). As a result, a difference may be generated between an actual position of the seat in the front-rear direction of the vehicle and a position of the seat determined and memorized by the apparatus. Furthermore, such operation may be repeatedly performed. Therefore, the difference may be accumulated. Accordingly, in a case where a movement of the seat is controlled on the basis of the memorized position of the seat in the front-rear direction of the vehicle (for example, in a case where the seat is controlled to return to the memorized position), an accurate operation may become difficult.

A need thus exists for an apparatus for a power seat, which is not susceptible to the drawback mentioned above.

SUMMARY

According to an aspect of this disclosure, an apparatus for a power seat includes: a motor; a transmitting member mechanically connected to a seat and driven by the motor, thereby changing a state of the seat; an operational switch outputting an operational signal indicating a changing direction of the state of the seat; a sensor outputting a single pulse according to a rotation of the motor; a controlling portion driving the motor in a rotational direction corresponding to the operational signal so that the state of the seat is changed and counting the pulse outputted according to the rotation of the motor, thereby determining the state of the seat and memorizing the state of the seat; a judging portion judging the changing direction of the state of the seat after a start of the driving of the motor on the basis of the pulse; and a drive continuing portion continuing the driving of the motor until the changing direction of the state of the seat is judged by the judging portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
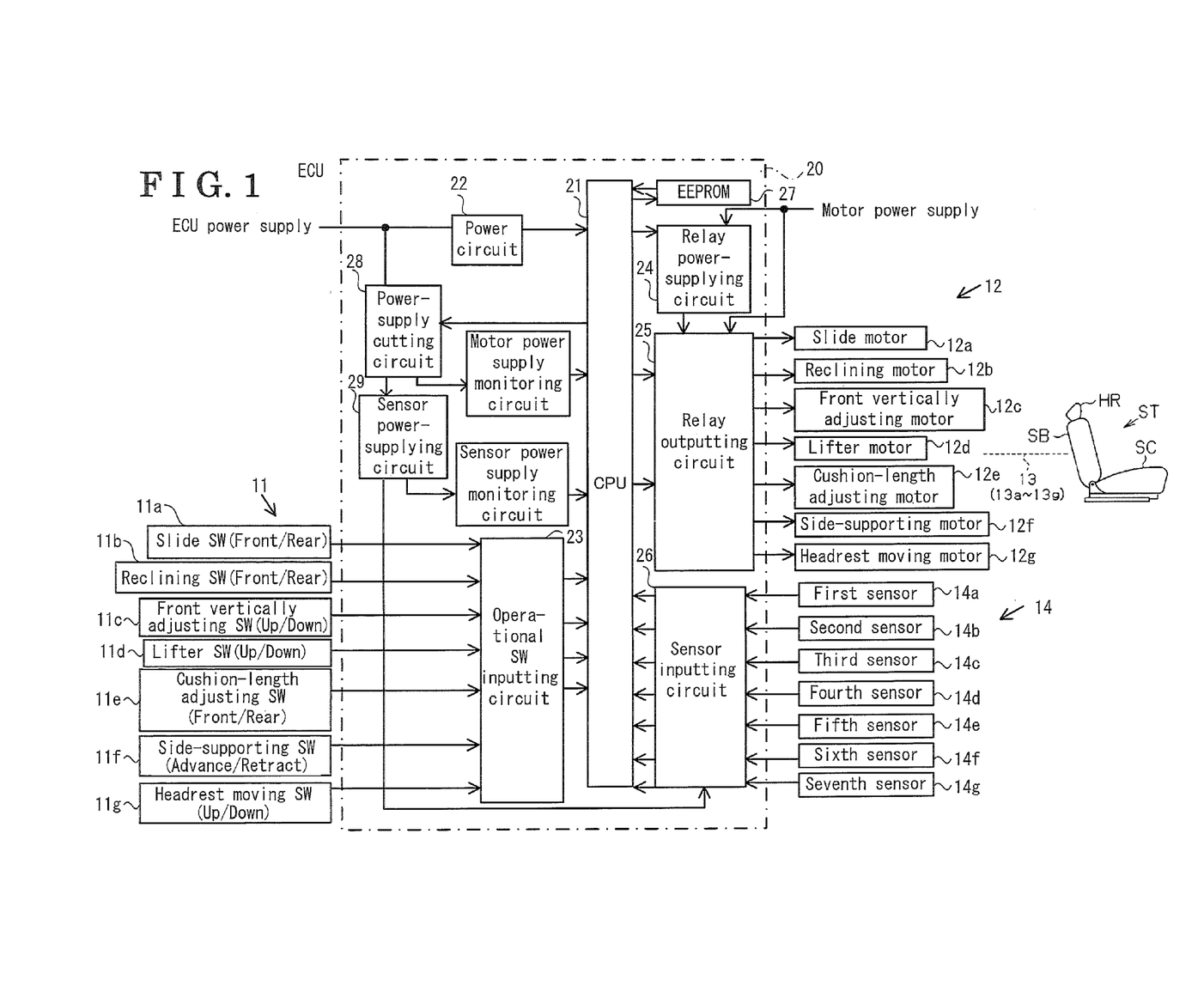
FIG. 1 is a block diagram illustrating an apparatus for a power seat according to an embodiment.

An embodiment of an apparatus for a power seat will be described hereinafter with reference to the attached drawings. FIG. 1 is a block diagram illustrating an electrical configuration of the apparatus for the power seat according to the embodiment. As illustrated in FIG. 1, a seat ST, which is mounted on a vehicle floor, includes a seat cushion SC for forming a seating surface, a seat back SB for forming a seat back portion and a headrest HR for forming a supporting portion of a head portion of an occupant. The seat back SB is attached to a rear end portion of the seat cushion SC so as to be pivotable in a front-rear direction of the vehicle. The headrest HR is attached to an upper portion of the seat back SB so as to be movable in an upper-lower direction of the vehicle. Further, the apparatus for the power seat includes a seat slide mechanism for adjusting a position of the seat ST in the front-rear direction of the vehicle, a reclining mechanism for adjusting a reclining angle of the seat back SB relative to the seat cushion SC in the front-rear direction of the vehicle, a front vertically adjusting mechanism for adjusting a height of a front portion of the seat cushion SC, a lifter mechanism for adjusting a height of a rear portion of the seat cushion SC, a seat-length adjusting mechanism for adjusting a position of the seat cushion SC relative to the seat back SB in the front-rear direction of the vehicle, a side-supporting mechanism for adjusting a protruding length of both side portions of the seat cushion SC in a width direction thereof, and a headrest-moving mechanism for adjusting a height of the headrest HR in the upper-lower direction of the vehicle. Each of the mechanisms includes transmitting members (a transmitting member) 13 (13a to 13g), which are driven by motors (a motor) 12 (12a to 12g), respectively. When each of the transmitting members 13 is driven by the motor 12 in a direction corresponding to a rotational direction of the motor 12, each of the mechanisms performs the above-described adjusting operation. A detailed illustration of a mechanical configuration of the transmitting members 13 for connecting the motors 12 and the seat ST in an interlocking manner is omitted.

More specifically, when a slide motor 12a rotates, a first transmitting member 13a corresponding to the slide motor 12a is driven so as to move the seat ST in the front-rear direction of the vehicle. Consequently, a position of the seat ST in the front-rear direction of the vehicle is adjusted. When a reclining motor 12b rotates, a second transmitting member 13b corresponding to the reclining motor 12b is driven so as to pivot the seat back SB relative to the seat cushion SC in the front-rear direction of the vehicle. Consequently, a reclining angle of the seat back SB relative to the seat cushion SC in the front-rear direction of the vehicle is adjusted. When a front vertically adjusting motor 12c rotates, a third transmitting member 13c corresponding to the front vertically adjusting motor 12c is driven so as to move the front portion of the seat cushion SC in the upper-lower direction of the vehicle. Consequently, a height of the front portion of the seat cushion SC is adjusted. When a lifter motor 12d rotates, a fourth transmitting member 13d corresponding to the lifter motor 12d is driven so as to move the rear portion of the seat cushion SC in the upper-lower direction of the vehicle. Consequently, a height of the rear portion of the seat cushion SC is adjusted. When a cushion-length adjusting motor 12e rotates, a fifth transmitting member 13e corresponding to the cushion-length adjusting motor 12e is driven so as to move the seat cushion SC relative to the seat back SB in the front-rear direction of the vehicle. Consequently, a position of the seat cushion SC relative to the seat back SB in the front-rear direction of the vehicle is adjusted, and a length of the seat cushion SC appears to be adjusted. When a side-supporting motor 12f rotates, a sixth transmitting member 13f corresponding to the side-supporting motor 12f is driven so as to extract/retract both side portions of the seat cushion SC in the width direction thereof. Consequently, a protruding length of both side portions of the seat cushion SC in a width direction thereof is adjusted. When a headrest moving motor 12g rotates, a seventh transmitting member 13g corresponding to the headrest moving motor 12g is driven so as to move the headrest HR in the upper-lower direction of the vehicle. Consequently, a height of the headrest HR is adjusted.

As illustrated in FIG. 1, the apparatus for the power seat includes an Electronic Control Unit (which will be referred to as an ECU hereinafter) 20 for controlling processes. The ECU 20 is configured by a Central Processing Unit (which will be referred to as CPU hereinafter) (a controlling portion) 21, a power circuit 22, an operational-switch inputting circuit 23, a relay power-supplying circuit 24, a relay outputting circuit 25, a sensor inputting circuit 26, and an Electrically Erasable PROM (which will be referred to as EEPROM hereinafter) 27.

The power circuit 22 stabilizes an ECU power supply, which is generated from a power supply of a battery of the vehicle, and then supplying power to the CPU 21. The operational-switch inputting circuit 23 is connected to operational switches (an operational switch) 11 (11a to 11g) mounted, for example, beside the seat cushion SC. The operational-switch inputting circuit 23 inputs an operational signal, outputted from the operational switches 11 (11a to 11g), into the CPU 21. The operational switches 11 (11a to 11g) are a manually-operated switch for controlling operation of each of the mechanisms separately. More specifically, a slide switch 11a outputs an operational signal indicating a moving direction (the front or rear direction of the vehicle) of the seat ST. A reclining switch 11b outputs an operational signal indicating a reclining direction (the front or rear direction of the vehicle) of the seat cushion SC relative to the seat back SB. A front vertically adjusting switch 11c outputs an operational signal indicating a moving direction (the upper or lower direction of the vehicle) of the front portion of the seat cushion SC. A lifter switch 11d outputs an operational signal indicating a moving direction (the upper or lower direction of the vehicle) of the rear portion of the seat cushion SC. A cushion-length adjusting switch 11e outputs an operational signal indicating a moving direction (the front or rear direction of the vehicle) of the seat cushion SC relative to the seat back SB. A side-supporting switch 11f outputs an operational signal indicating an extracting/retracting direction of both side portions of the seat cushion SC in the width direction thereof. A headrest moving switch 11g outputs an operational signal indicating a moving direction (the upper or lower direction of the vehicle) of the headrest HR.

The relay power-supplying circuit 24 and the relay outputting circuit 25 are supplied with power of a motor power supply that is generated from the power supply of the battery. Each of the relay power-supplying circuit 24 and the relay outputting circuit 25 is controlled to be driven by the CPU 21. The relay power-supplying circuit 24 generates a relay power supply by use of a power of the motor power supply, and then supplies the power of the relay power supply to relays (electromagnetic coils) of the relay outputting circuit 25. The relay outputting circuit 25 is connected to each of the above-described motors 12 (12a to 12g). The relay outputting circuit 25 supplies the power of the motor power supply to one of the motors 12 (12a to 12g) that has been brought to a conduction state by means of the relay, to which the power is supplied. Consequently, one of the motors 12 (12a to 12g), supplied with the power, rotates. A rotational direction of each of the motors 12 is switched according to an electrical polarity of the power of the motor power supply, supplied to each of the motors 12.

The sensor inputting circuit 26 is connected to sensors (a sensor) 14 (a first sensor 14a, a second sensor 14b, a third sensor 14c, a fourth sensor 14d, a fifth sensor 14e, a sixth sensor 14f and a seventh sensor 14g) for detecting a rotation of the motors 12 (12a to 12g). A detection signal of the sensors 14 is inputted into the sensor inputting circuit 26 and the sensor inputting circuit 26 outputs the detection signal to the CPU 21. Each of the sensors 14 includes only one hall element that is arranged to face a magnet rotor rotating integrally with an output shaft of each of the motors 12. Each of the sensors 14 outputs a single pulse corresponding to the rotation of each of the motors 12 (12a to 12g). In other words, a rotational direction of the motors 12 may not be judged only on the basis of the single pulse, outputted from the sensors 14 in response to the rotation of the motors 12. The rotational direction of the motors 12 is judged on the basis of the electrical polarity of the motors 12 or on the basis of the operational signal of the operational switches 11. Further, the power of the ECU power supply is supplied to the sensor inputting circuit 26 via a power-supply cutting circuit 28 and a sensor power-supplying circuit 29.

According to the above-described configuration, when each of the operational switches 11 (11a to 11g) is operated by a user, the CPU 21 controls a driving of each of the motors 12 (12a to 12g) so that each of the motors 12 (12a to 12g) rotates in a direction corresponding to a direction for changing a state of the seat ST, which is indicated by the operational signal of the operational switches 11. Consequently, a state of the seat ST is changed in the above-described manner. Further, the CPU 21 determines the state of the seat ST by calculating a pulse that is outputted from each of the sensors 14 (14a to 14g) in response to the rotation of each of the motors 12 (12a to 12g). The CPU 21 memorizes in the EEPROM 27 the state of the seat ST, which is determined at the time when each of the motors 12 (12a to 12g) is stopped.

A manner of controlling a driving of the motors 12 by the CPU 21 (the ECU 20) will be further described hereinafter. The driving of each of the motors 12 (12a to 12g) is controlled in substantially the same manner. Therefore, only the manner of controlling the driving of the slide motor 12a will be described hereinafter as an example.

When a request for an activation of the slide motor 12a (the seat slide mechanism) is determined on the basis of the operation of the slide switch 11a by the user, the CPU 21 starts to drive the slide motor 12a in a rotational direction corresponding to the moving direction (the front or rear direction of the vehicle) of the seat ST indicated by the operational signal. Then, after the driving of the slide motor 12a is started, the CPU 21 judges the rotational direction of the slide motor 12a (a judging portion).

When pulse is outputted from the first sensor 14a, the rotation of the slide motor 12a is detected. At that time, the CPU 21 determines that the rotational direction of the slide motor 12a is identical to a rotational direction corresponding to the moving direction of the seat ST (the front or rear direction) indicated by the operational signal of the slide switch 11a (which will be hereinafter referred to as a forward direction). Further, the CPU 21 counts in the forward direction the number of times of the pulse, which is outputted while the slide motor 12a is being driven and after the driving of the slide motor 12a is stopped, and then updates and memorizes a position of the seat ST in the front-rear direction of the vehicle. More specifically, in a case where the forward direction corresponds to a direction for increasing the number of times of the pulse, the CPU 21 increases the number of times of the pulse by the amount outputted while the slide motor 12a is being driven and after the driving of the slide motor 12a is stopped. Herein, there may be an inertial rotation of the slide motor 12a. Therefore, the number of times of the pulse, outputted after the driving of the slide motor 12a, is also counted.

On the other hand, when a state where the pulse is not outputted from the first sensor 14a (i.e., a state where the slide motor 12a is not rotated) continues for more than a predetermined time (for example, 300 ms), the slide motor 12a is judged to be in a mechanically-locked state. At that time, the CPU 21 judges that the rotational direction of the slide motor 12a is identical to an opposite direction of the forward direction (which will be referred to as a reverse direction). Further, the CPU 21 counts in the reverse direction the number of times of the pulse, which is outputted after the driving of the slide motor 12a is stopped, and then updates and memorizes a position of the seat ST in the front-rear direction of the vehicle. More specifically, in a case where the forward direction corresponds to a direction for increasing the number of times of the pulse, the CPU 21 decreases the number of times of the pulse by the amount outputted after the driving of the slide motor 12a is stopped. Herein, the number of times of the pulse outputted after the drive of the slide motor 12a is stopped is decreased in the above-described manner because the user may operate the slide switch 11a so as to start the driving of the slide motor 12a that has been in the mechanically-locked state after the slide motor 12a is driven in the reverse direction (a reverse rotation) due to a reaction force of a load-applied side (for example, the first transmitting member 13a and the like) after the driving of the slide motor 12a is stopped.

After the driving of the slide motor 12a is started, the CPU 21 continues to drive the slide motor 12a, regardless of a state of the slide switch 11a (an operated state or a released state), until the judging of the rotational direction (the forward or reverse direction) of the slide motor 12a is completed (a drive continuing portion). After the judging of the rotational direction of the slide motor 12a is completed, the driving of slide motor 12a is stopped in response to the request for stopping the activation of the slide motor 12a (the seat slide mechanism) on the basis of a release of the slide switch 11a by the user.

Further, the CPU 21 prohibits the judging of the rotational direction (the forward or reverse direction) of the slide motor 12a on the basis of the pulse outputted within a predetermined time T (for example, 200 ms) after the driving of the slide motor 12a is started (a prohibiting portion). The slide motor 12a may (idly) rotate without moving the seat ST due to a torsion of the load-applied side (for example, the first transmitting member 13a and the like) or a backlash between components in a power-transmitting path, which may be generated at the time of the driving start of the slide motor 12a. Therefore, the judging of the rotational direction of the slide motor 12a on the basis of such idle rotation of the slide motor 12a is prohibited. Accordingly, the rotational direction of the slide motor 12a may be more accurately judged. Alternatively, the judging of the rotational direction (the forward direction or reverse direction) of the slide motor 12a may be prohibited on the basis of a predetermined number of times of the pulse, outputted after the driving of the slide motor 12a is started.

A manner of controlling of the driving of the slide motor 12a by the CPU 21 (the ECU 20) will be described hereinafter with reference to flowcharts shown in FIGS. 2 and 3. The process is an interrupt process repeatedly executed at a regular time interval.

Figure 2:
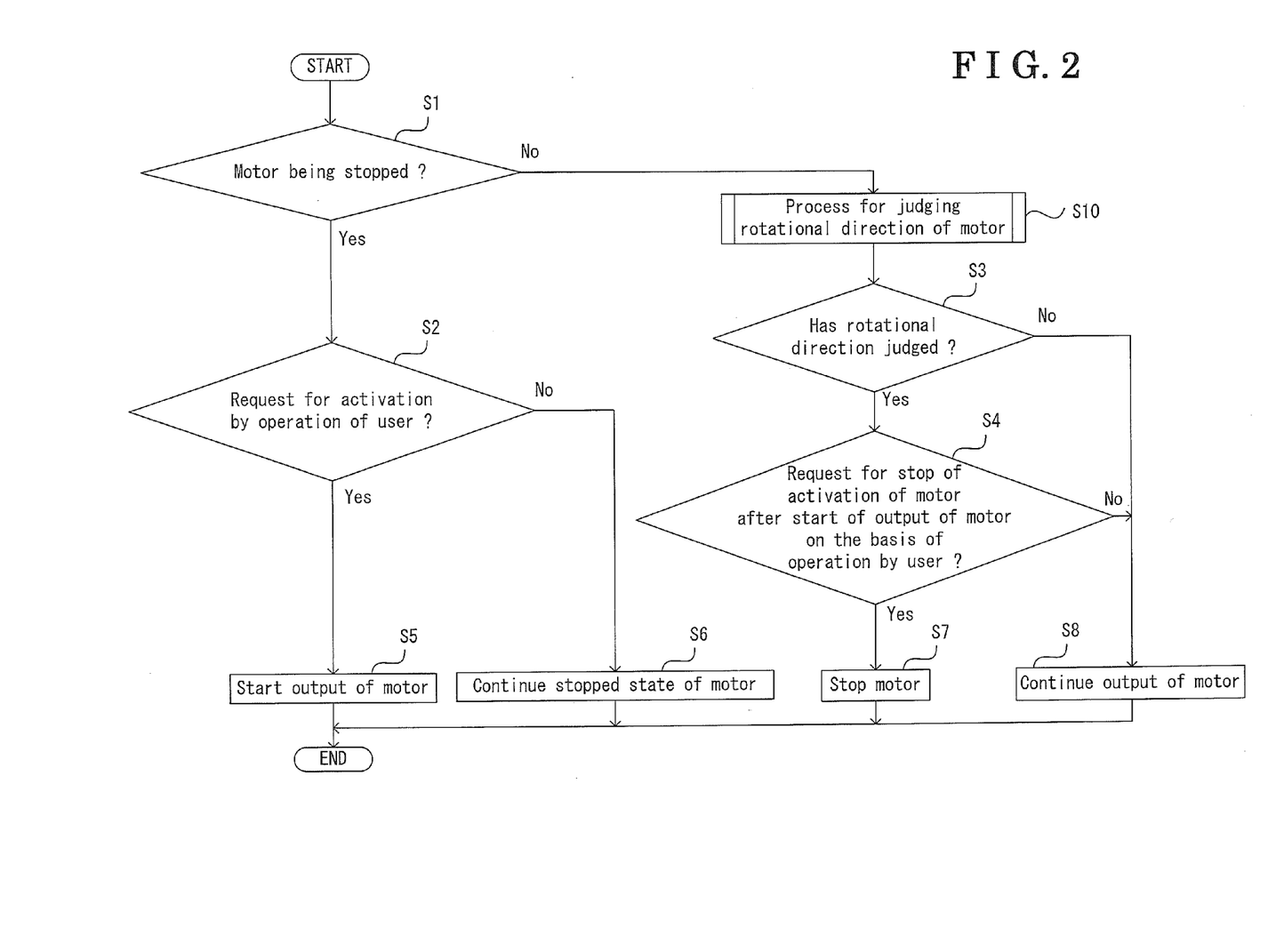
FIG. 2 is a flow chart illustrating a controlling manner of the apparatus for the power seat.
Figure 3:
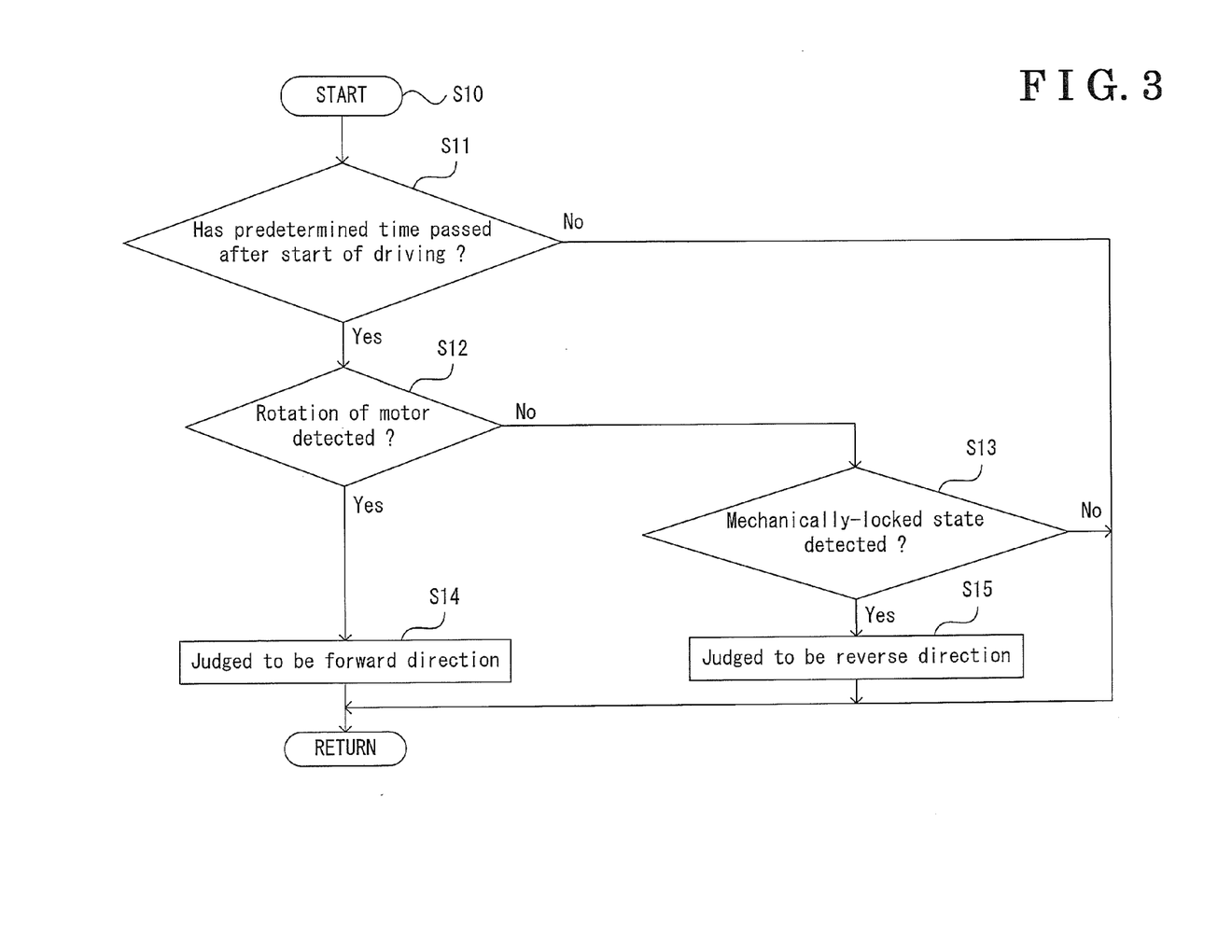
FIG. 3 is a flow chart illustrating a controlling manner of the apparatus for the power seat.

When a process shifts to the routine shown in FIG. 2, whether or not the slide motor 12a is in a stopped state is determined (S1). In a case where the stopped state of the slide motor 12a is determined, whether or not there is the request for the activation of the slide motor 12a is determined on the basis of the operation of the user (S2). When it is determined that there is not the request for the activation of the slide motor 12a on the basis of the operation of the user, the slide motor 12a continues to be in the stopped state (S6). On the other hand, when it is determined that there is the request for the activation of the slide motor 12a on the basis of the operation of the user, the driving of the slide motor 12a (an output of a motor) is started (S5).

In a case where the stopped state of the slide motor 12a is not determined according to the start of the driving of the slide motor 12a, a process for judging a rotational direction of a motor is executed (S10). More specifically, as illustrated in FIG. 3, whether or not the predetermined time T has passed is determined after the start of the driving of the slide motor 12a (S11). Then, in a case where the predetermined time T is determined not to have been passed, the rotational direction of the slide motor 12a is not judged, and the process returns back to the routine shown in FIG. 2. On the other hand, in a case where the predetermined time T is determined to have been passed, whether or not the rotation of the slide motor 12a is detected is determined on the basis of the pulse outputted from the first sensor 14a (S12).

In a case where the detection of the rotation of the slide motor 12a is determined, the rotational direction of the slide motor 12a is judged to be the forward direction (S14), and then the process returns to the routine shown in FIG. 2. On the other hand, in a case where the detection of the rotation of the slide motor 12a is not determined in S12, whether or not the slide motor 12a is detected to be in the mechanically-locked state is determined (S13). In a case where the detection of the mechanically-locked state of the slide motor 12a is determined, the rotational direction of the slide motor 12a is judged to be in the reverse direction (S15), and then the process returns to the routine shown in FIG. 2. On the other hand, in a case where the detection of the mechanically-locked state of the slide motor 12a is not determined, the rotational direction of the slide motor 12a is not judged, and then the process returns to the routine shown in FIG. 2.

When the process returns back to the routine shown in FIG. 2, whether or not the rotational direction of the slide motor 12a has been confirmed (judged) is determined (S3). In a case where the confirmation of the rotational direction of the slide motor 12a is not determined, the slide motor 12a continues to be driven (S8). On the other hand, in a case where the confirmation of the rotational direction of the slide motor 12a is determined, whether or not there is the request for stopping of the activation of the slide motor 12a by the operation of the user after the start of the driving of the slide motor 12a is determined (S4). In a case where the request for stopping of the activation of the slide motor 12a by the operation of the user is not determined, the slide motor 12a continues to be driven (S8). On the other hand, in a case where the request for stopping of the activation of the slide motor 12a by the operation of the user is determined, the driving of the slide motor 12a is stopped (S7). Accordingly, after the driving of the slide motor 12a is started, the slide motor 12a continues to be driven until the judging of the rotational direction (the forward or reverse direction) of the slide motor 12a is completed, regardless of the state of the slide switch 11a.

As described above, the CPU 21 determines the position of the seat ST in the front-rear direction of the vehicle by counting the pulse outputted from the first sensor 14a in response to the rotation of the slide motor 12a. Therefore, in a case where the rotational direction of the slide motor 12a is judged to be the forward direction, the CPU 21 counts the pulse in the direction corresponding to the moving direction (the front or rear direction) of the seat ST indicated by the operational signal of the slide switch 11a, thereby updating and memorizing the position of the seat ST in the front-rear direction of the vehicle. On the other hand, in a case where the rotational direction of the slide motor 12a is judged to be the reverse direction, the CPU 21 counts the pulse in the opposite direction of the direction corresponding to the moving direction (the front or rear direction) of the seat ST indicated by the operational signal of the slide switch 11a, thereby updating and memorizing the position of the seat ST in the front-rear direction of the vehicle. Accordingly, in a case where the user operates the slide switch 11a so as to start the driving of the slide motor 12a that has been in the mechanically-locked state after the slide motor 12a is rotated in the reverse direction (the reverse rotation) due to the reaction force of the load-applied side (for example, the first transmitting member 13a and the like) even after the driving of the slide motor 12a is stopped, a positional difference between an actual position of the seat ST and a position detected by the apparatus in the front-rear direction of the vehicle may be reduced.

The manner of controlling of the driving of the slide motor 12a by the CPU 21 (the ECU 20) has been described. Further, as mentioned above, the driving of other motors 12b to 12g is controlled in a similar manner.

Following effects may be obtained according to the above-described embodiment. According to the embodiment, the motors 12 continue to be driven after the start of the driving of the motors 12 until the changing direction (i.e., the rotational direction of the motors 12) of the seat ST is judged. Therefore, for example, in a case where the user operates the operational switches 11 while the motors 12 are being in the mechanically-locked state, and then immediately cancels the operation of the operational switches 11, the motors 12 continue to be driven until the judging of the changing direction of the seat ST is completed, regardless of the state of the operational switches 11. Even when the motors 12 are driven in the reverse direction (the reverse rotation) due to the reaction force of the load-applied side (the transmitting members 13 and the like), the changing direction of the state of the seat ST is correctly judged in the opposite direction of the direction indicated by the operational signal on the basis of the outputted pulse. Therefore, the difference between the actual state of the seat ST and the state of the seat ST detected by the apparatus may be reduced.

According to the embodiment, in a case where the motors 12 are not in the mechanically-locked state, the changing direction of the state of the seat ST (i.e., the rotational direction of the motors 12) may be quickly judged after the start of the rotation of the motors 12 on the basis of the outputted pulse. Further, the continuation of the driving of the motors 12 may be quickly canceled. Accordingly, a deterioration of the feeling due to the continuation of the driving of the motors 12 that are not in the mechanically-locked state may be restricted. On the other hand, in a case where the motors 12 are in the mechanically-locked state, the motors 12 continue to be driven until the mechanically-locked state of the motors 12 is judged. However, the transmitting members 13 and the like are not actually actuated. Therefore, a deterioration of the feeling may be restricted.

According to the embodiment, even when the motors 12 rotate without changing the state of the seat ST due to a torsion of the load-applied side (the transmitting members 13 and the like) or a backlash in a power-transmitting path, which may be generated at the time of the driving start of the motors 12, the judging of the changing of the state of the seat ST (i.e., the rotational direction of the motors 12) on the basis of the pulse outputted after the driving start of the motors 12 within the predetermined time T or the predetermined number of times of the pulse is prohibited. Therefore, the changing direction of the seat ST may be more accurately judged.

According to the embodiment, in a case where the changing direction of the seat ST is judged to correspond to the changing direction of the seat ST indicated by the operational signal, the pulse outputted after the driving start of the motors 12 is counted in the direction corresponding to the changing direction of the seat ST. Therefore, for example, even when the motors 12 inertially rotate after the stopping of the driving of the motors 12, the state of the seat ST may be suitably correctly determined and memorized. On the other hand, in a case where the changing direction of the seat ST is judged to be opposite to the corresponding direction of the changing direction of the seat ST indicated by the operational signal, the pulse outputted after the driving start of the motors 12 is counted in the opposite direction of the direction corresponding to the changing direction of the seat ST. Therefore, for example, even when the motors 12 in the mechanically-locked state start to be driven, and subsequently driven in the reverse direction (the reverse rotation) after the stopping of the driving of the motors 12 due to the reaction force of the load-applied side (the transmitting members 13 and the like), the state of the seat ST may be suitably correctly determined and memorized.

The above-described embodiment may be modified in the following manner. The counting of the pulse outputted after the stopping of the driving of the motors 12 (in the judged direction, the forward direction or the reverse direction) may be performed only within the predetermined time after the stopping of the driving of the motors 12.

In a case where the rotational direction of the motors 12 is judged to be the forward direction after the start of the driving of the motors 12, and subsequently, the motors 12 are judged to be in the mechanically-locked state, the pulse outputted from the sensors 14 after the stop of the driving of the motors 12 may be counted in the reverse direction, thereby updating and memorizing the state of the seat ST. More specifically, in a case where the forward direction corresponds to the direction for increasing the number of times of the pulse, the number of times of the pulse is decreased by an amount outputted after the stopping of the driving of the motors 12. Consequently, the state of the seat ST may be judged in consideration of the driving of the motors 12 in the reverse direction (the reverse rotation) due to the reaction force of the load-applied side (the transmitting members 13 and the like) when the motors 12 are stopped to be in the mechanically-locked state. Accordingly, even when the motors 12 become the mechanically-locked state after the judgment of the difference between the actual state of the seat ST and the state of the seat ST detected by the apparatus may be reduced.

An end of a movable range of the seat ST corresponding to the mechanically-locked state may be set to be a default value, and when the mechanically-locked state of the motors 12 is determined, the seat ST may be forcibly preset to the default value. In such a case, the difference between the actual state of the seat ST and the state of the seat ST detected by the apparatus, which may be accumulated in accordance with a passing time, may be removed at a predetermined timing.

The sensors 14 are not limited to be configured by the hall elements. The sensors 14 may be configured by other elements, each of which outputs a single pulse in accordance with the rotation of the motors 12, for example, a rotary encoder and the like.

The embodiment may be applied to a power retraction seat for electrically switching a state of a seat between a retracted state and a usage state (a developed state). Further, the embodiment may be applied to a memory seat, in which a seat is moved to return to a memorized state after the state of the seat is changed.

Accordingly, the motors 12 continue to be driven by the CPU 21 after the start of the driving of the motors 12 until the changing direction of the seat ST is judged by the CPU 21. Therefore, for example, in a case where the user operates the operational switches 11 while the motors 12 are being in the mechanically-locked state, and then immediately cancels the operation of the operational switches 11, the motors 12 continue to be driven until the judging of the changing direction of the seat ST is completed, regardless of the state of the operational switches 11 Even when the motors 12 are driven in the reverse direction (the reverse rotation) due to the reaction force of the load-applied side (the transmitting members 13 and the like), the changing state of the seat ST is correctly judged to be in the opposite direction of the direction indicated by the operational signal on the basis of the outputted pulse. Therefore, the difference between the actual state of the seat ST and the state of the seat ST detected by the apparatus may be reduced.

According to the embodiment, the judging portion 21 judges the changing direction of the state of the seat ST to correspond to the changing direction of the state of the seat ST indicated by the operational signal when the rotation of the motor 12 is detected on the basis of the pulse. The judging portion 21 judges the changing direction of the state of the seat ST to be opposite to the changing direction of the state of the seat ST indicated by the operational signal when a state where the pulse is not outputted continues for more than a predetermined time and a mechanically-locked state of the motor 12 is determined.

Accordingly, in a case where the motors 12 are not in the mechanically-locked state, the changing direction of the state of the seat ST may be quickly judged after the start of the rotation of the motors 12 on the basis of the outputted pulse. Further, the continuation of the driving of the motors 12 by the CPU 21 may be quickly canceled. Accordingly, a deterioration of the feeling due to the continuation of the driving of the motors 12 that are not in the mechanically-locked state may be restricted. On the other hand, in a case where the motors 12 are in the mechanically-locked state, the motors 12 continue to be driven until the mechanically-locked state of the motors 12 is judged. However, the transmitting members 13 and the like are not actually actuated. Therefore, a deterioration of the feeling may be restricted.

According to the embodiment, the apparatus for the power seat further including the prohibiting portion 21 prohibiting the judging of the changing direction of the state of the seat ST by the judging portion 21 on the basis of the pulse outputted within a predetermined time T after the start of the driving of the motor 12 or on the basis of a predetermined number of times of the pulse.

Accordingly, even when the motors 12 rotate without changing the state of the seat ST due to a torsion of the load-applied side (the transmitting members 13 and the like) or a backlash in a power-transmitting path, which may be generated at the time of the driving start of the motors 12, the judging of the changing of the state of the seat ST on the basis of the pulse outputted after the driving start of the motors 12 within the predetermined time T or the predetermined number of times of the pulse is prohibited. Therefore, the changing direction of the seat ST may be more accurately judged.

According to the embodiment, the pulse outputted after stopping of the driving of the motor 12 is counted in a direction corresponding to the changing direction of the state of the seat ST when the judging portion 21 judges that the changing direction of the state of the seat ST corresponds to the changing direction of the state of the seat ST indicated by the operational signal. The pulse outputted after stopping of the driving of the motor 12 is counted in an opposite direction to the direction corresponding to the changing direction of the state of the seat ST when the judging portion 21 judges that the changing direction of the state of the seat ST is opposite to the changing direction of the state of the seat ST indicated by the operational signal.

Accordingly, in a case where the changing direction of the seat ST is judged to correspond to the changing direction of the seat ST indicated by the operational signal, the pulse outputted after the driving start of the motors 12 is counted in the direction corresponding to the changing direction of the seat ST. Therefore, for example, even when the motors 12 inertially rotate after the stopping of the driving of the motors 12, the state of the seat ST may be suitably correctly determined and memorized. On the other hand, in a case where the changing direction of the seat ST is judged to be opposite to the corresponding direction of the changing direction of the seat ST indicated by the operational signal, the pulse outputted after the driving start of the motors 12 is counted in the opposite direction of the direction corresponding to the changing direction of the seat ST. Therefore, for example, even when the motors 12 in the mechanically-locked state start to be driven, and subsequently driven in the reverse direction (the reverse rotation) after the stopping of the driving of the motors 12 due to the reaction force of the load-applied side (the transmitting members 13 and the like), the state of the seat ST may be suitably correctly determined and memorized.

According to the embodiment, the pulse outputted after stopping of the driving of the motor 12 is counted in an opposite direction to the direction corresponding to the changing direction of the state of the seat ST when a state where the pulse is not outputted continues for more than a predetermined time and the motor 12 is determined to be in the mechanically-locked state after the judging portion 21 judges that the changing direction of the state of the seat ST corresponds to the changing direction of the state of the seat ST indicated by the operational signal.

Accordingly, for example, even when the motors 12 that is being in mechanically-locked state starts to be driven, and subsequently driven in the reverse direction (the reverse rotation) after the stopping of the driving of the motors 12 due to the reaction force of the load-applied side (the transmitting members 13 and the like), the state of the seat ST may be suitably correctly determined and memorized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for a power seat comprising:
   a motor;
   a transmitting member mechanically connected to a seat and driven by the motor, thereby changing a state of the seat;
   an operational switch outputting an operational signal indicating a changing direction of the state of the seat;
   a sensor outputting a single pulse according to a rotation of the motor;
   a controlling portion driving the motor in a rotational direction corresponding to the operational signal so that the state of the seat is changed and counting the pulse outputted according to the rotation of the motor, thereby determining the state of the seat and memorizing the state of the seat;
   a judging portion judging the changing direction of the state of the seat after a start of the driving of the motor on the basis of the pulse;
   a drive continuing portion continuing the driving of the motor until the changing direction of the state of the seat is judged by the judging portion; and
   a pulse outputted after stopping of the driving of the motor is counted in an opposite direction to the direction corresponding to the changing direction of the state of the seat when a state where the pulse is not outputted continues for more than a predetermined time and the motor is determined to be in the mechanically-locked state after the judging portion judges that the changing direction of the state of the seat corresponds to the changing direction of the state of the seat indicated by the operational signal.

2. The apparatus for the power seat according to claim 1, wherein
   the judging portion judges the changing direction of the state of the seat to correspond to the changing direction of the state of the seat indicated by the operational signal when the rotation of the motor is detected on the basis of the pulse, and wherein
   the judging portion judges the changing direction of the state of the seat to be opposite to the changing direction of the state of the seat indicated by the operational signal when a state where the pulse is not outputted continues for more than a predetermined time and a mechanically-locked state of the motor is determined.

3. The apparatus for the power seat according to claim 2 further including
   a prohibiting portion prohibiting the judging of the changing direction of the state of the seat by the judging portion on the basis of the pulse outputted within a predetermined time after the start of the driving of the motor or on the basis of a predetermined number of times of the pulse.

4. The apparatus for the power seat according to claim 3, wherein
   the pulse outputted after stopping of the driving of the motor is counted in a direction corresponding to the changing direction of the state of the seat when the judging portion judges that the changing direction of the state of the seat corresponds to the changing direction of the state of the seat indicated by the operational signal, and wherein
   the pulse outputted after stopping of the driving of the motor is counted in an opposite direction to the direction corresponding to the changing direction of the state of the seat when the judging portion judges that the changing direction of the state of the seat is opposite to the changing direction of the state of the seat indicated by the operational signal.

5. The apparatus for the power seat according to claim 2, wherein
   the pulse outputted after stopping of the driving of the motor is counted in a direction corresponding to the changing direction of the state of the seat when the judging portion judges that the changing direction of the state of the seat corresponds to the changing direction of the state of the seat indicated by the operational signal, and wherein
   the pulse outputted after stopping of the driving of the motor is counted in an opposite direction to the direction corresponding to the changing direction of the state of the seat when the judging portion judges that the changing direction of the state of the seat is opposite to the changing direction of the state of the seat indicated by the operational signal.

6. The apparatus for the power seat according to claim 1 further including
   a prohibiting portion prohibiting the judging of the changing direction of the state of the seat by the judging portion on the basis of the pulse outputted within a predetermined time after the start of the driving of the motor or on the basis of a predetermined number of times of the pulse.

7. The apparatus for the power seat according to claim 6, wherein the pulse outputted after stopping of the driving of the motor is counted in a direction corresponding to the changing direction of the state of the seat when the judging portion judges that the changing direction of the state of the seat corresponds to the changing direction of the state of the seat indicated by the operational signal, and wherein the pulse outputted after stopping of the driving of the motor is counted in an opposite direction to the direction corresponding to the changing direction of the state of the seat when the judging portion judges that the changing direction of the state of the seat is opposite to the changing direction of the state of the seat indicated by the operational signal.

8. The apparatus for the power seat according to claim 1, wherein the pulse outputted after stopping of the driving of the motor is counted in a direction corresponding to the changing direction of the state of the seat when the judging portion judges that the changing direction of the state of the seat corresponds to the changing direction of the state of the seat indicated by the operational signal, and wherein the pulse outputted after stopping of the driving of the motor is counted in an opposite direction to the direction corresponding to the changing direction of the state of the seat when the judging portion judges that the changing direction of the state of the seat is opposite to the changing direction of the state of the seat indicated by the operational signal.

* * * * *